Dec. 27, 1927.

E. H. FISHER 1,653,803

LABORATORY TONGS

Filed March 31, 1927

WITNESSES

Edwin H. Fisher
INVENTOR
by Winter, Brown & Critcher
his attorneys

Patented Dec. 27, 1927.

1,653,803

UNITED STATES PATENT OFFICE.

EDWIN H. FISHER, OF PITTSBURGH, PENNSYLVANIA, ASSIGNOR TO FISHER SCIENTIFIC COMPANY, OF PITTSBURGH, PENNSYLVANIA, A CORPORATION OF PENNSYLVANIA.

LABORATORY TONGS.

Application filed March 31, 1927. Serial No. 179,739.

This invention relates to laboratory tongs. More particularly it relates to laboratory tongs specially adapted for gripping and holding the handles of the laboratory dishes commonly called casseroles.

The objects of the invention are to provide a readily gripped, easily manipulated pair of tongs, adapted to engage and firmly hold handles of the casseroles commonly used in chemical laboratories. A special object is to furnish means of holding such handles with a grip that prevents rotation or longitudinal slipping of the handle.

Other objects and advantages will be apparent to those familiar with the art from the following specification.

Figure 1:
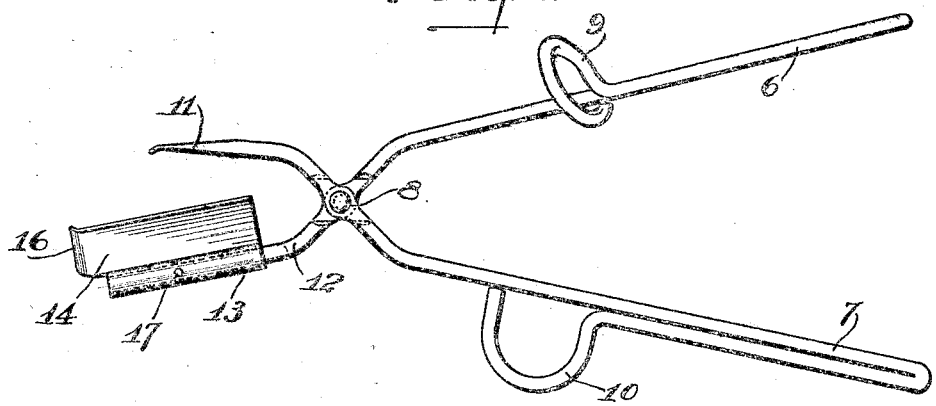
Figure 2:
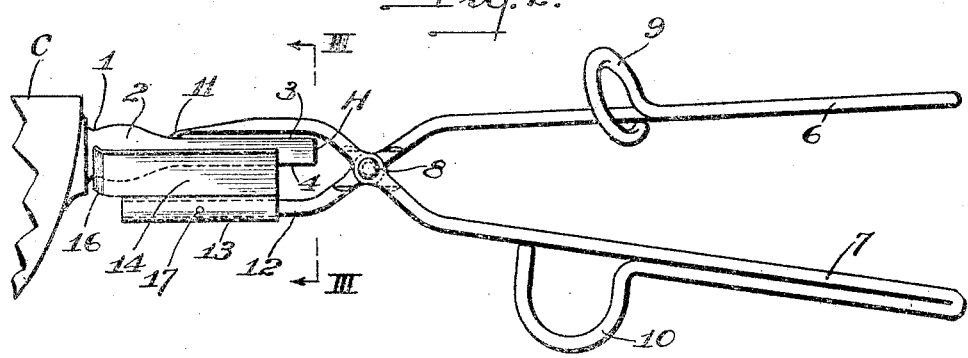
Figure 3:
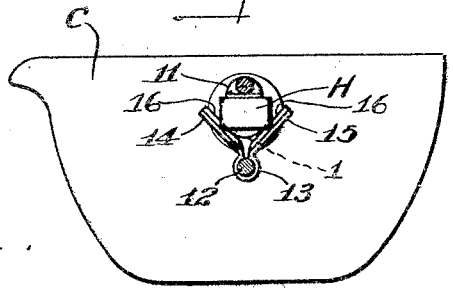

Referring to the drawings, Fig. 1 is a side elevation of a pair of tongs embodying the invention herein referred to; Fig. 2 is a similar view of the same tongs closed, and applied to the handle of a dish to be manipulated thereby; and Fig. 3 is a section on the line III—III of Fig. 2.

In laboratory work small porcelain dishes or casseroles C are used for mixing, heating, and evaporating fluids such as acids, and for holding other liquids during reactions, etc. These ordinarily have a handle H, comprising a groove 1 near the junction of the handle and the side of the casserole, then an enlarged rounded body portion 2, the outer end of the handle beyond portion 2 having two flattened faces 3 and 4 on the upper and lower sides thereof. These handles are ordinarily of standard shape, regardless of the size and shape of the casserole itself, so that one grip may be applied to all.

The handling of these casseroles under laboratory conditions is not easy. Frequently they are so hot that the lifting of the receptacles by hand is dangerous, and often they are filled with acids and corrosive chemicals, which, if spilled or splashed upon the hand, are very disagreeable or even injurious.

For the purpose of providing a firm grip, and an easy means of moving such dishes about, I have provided the laboratory tongs herein illustrated.

These comprise two handle members 6 and 7, joined by a rivet 8. The handles are formed of rod or wire stock, the free ends being bent back upon the body portions to form a thumb grip 9 on the handle 6 and a finger grip 10 on the handle 7, respectively. These grips, formed by terminal loops in the metal rods, are positioned a sufficient distance from the free ends of the handles so that the doubled portions 6 and 7 thereof furnish an enlarged grip for the palm of the hand of the operator. Finger loop 10 lies in the plane of the tongs and is adapted to engage the operator's index finger, while the thumb-hold or loop 9 is positioned at an oblique angle to the plane of the tongs so as to comfortably engage the thumb, while the other fingers and palm securely grip the handles 6 and 7, themselves, as will be obvious. By the plane of the tongs is meant the plane that would comprise the axes of both handles. It is substantially the plane that passes between the flat faces connected by the rivet 8.

The extension of the member 7 beyond the pivot pin 8 has a flat broadened terminal portion 11, which is adapted to seat upon and engage the upper flattened face 3 of the handle of a casserole.

The end 12 of the other member of the tongs extends into a cylindrical portion 13 of a plate jaw member. This comprises two upward laterally extending wing portions 14 and 15, as shown in Fig. 3. These wing portions have inturned terminal flanges 16 at their ends. The plate member is secured to the extension 12 by means of a rivet 17, which extends through the cylindrical portion 13 and the portion 12 of the tong member 6 therein.

When these tongs are used for gripping the handle of a casserole, as shown in Fig. 2, the broad flattened straight-edged portion 11 of the upper tong member seats upon and grips the upper flattened face 3 of the casserole handle. At the same time the trough-like jaw formed by the wings 14 and 15 engages the two under sides of the rounded portion 2 of the handle, while the flanges 16 of these wing members extend into and seat in the groove 1 of the handle.

When pressure is applied to the handle ends of the tongs the handle of the casserole is therefore securely gripped in the jaws of the tongs, so that it can not be rotated and can not move backward or forward. By this means the dish may be handled and moved with security, and without danger of slipping or falling out of the grip of the tongs. It may be safely tilted to pour out the contents, and, due to the flat faces 11 and 3 in firm engagement there is no danger of the dish slipping or unduly tilting.

Preferably the tongs are made of non-corrosive steel, such as the present chromium alloy steel, so that acids will not affect it.

I claim:

1. Laboratory tongs comprising a flat jaw and a trough-shaped jaw, the latter having a terminal inturned flange, the flat jaw terminating short of the said flange, whereby to grip a casserole handle and hold it against rotation and longitudinal movement.

2. Laboratory tongs for engaging casserole handles, comprising a lower jaw adapted to grip the handle on three opposing faces whereby to prevent lateral or forward movement of the handle, and an upper jaw adapted to grip a non-circular portion of the handle whereby to prevent rotation thereof.

3. Laboratory tongs for engaging casserole handles, comprising a lower jaw adapted to grip the handle on three opposing faces whereby to prevent lateral or forward movement of the handle, and an upper jaw adapted to grip a non-circular portion of the handle whereby to prevent rotation thereof, the lower jaw being formed of a separate plate bent to trough shape and attached to the end of one of the tong members in cooperative position.

4. Laboratory tongs for engaging casserole handles, comprising a lower jaw adapted to grip the handle on three opposing faces whereby to prevent lateral movement of the handle, said jaw being formed of a separate plate bent to trough shape and attached to the end of the lower tong member in cooperative jaw-forming position, and an upper jaw adapted to grip a non-circular portion of the handle whereby to prevent rotation thereof.

In testimony whereof, I sign my name.

EDWIN H. FISHER.